United States Patent Office 3,597,348
Patented Aug. 3, 1971

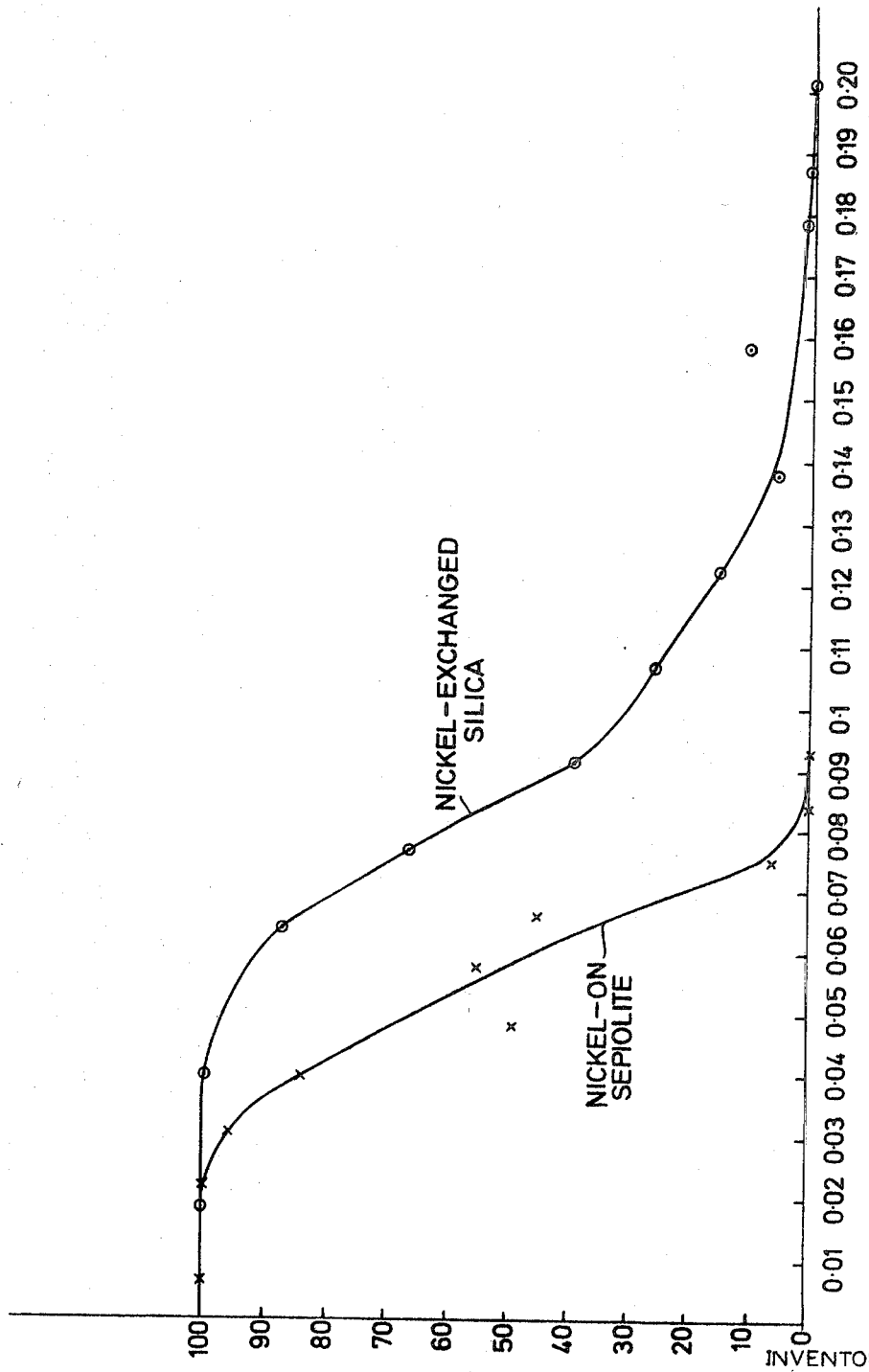

3,597,348
HYDROGENATION OR HYDROCRACKING WITH A NICKEL ON SILICA CATALYSTS
Kenneth Hugh Bourne, Knaphill, Woking, Christopher John Leonard Metcalfe, Sunbury, and Alan Richard Thornhill, Epsom, England, assignors to The British Petroleum Company Limited, London, England
Continuation of application Ser. No. 553,546, May 27, 1966. This application May 14, 1969, Ser. No. 859,530
Claims priority, application Great Britain, Jan. 12, 1966, 1,432/66
Int. Cl. C07c 5/02; C10g 13/02
U.S. Cl. 208—110
12 Claims

ABSTRACT OF THE DISCLOSURE

This invention relates to a process for the hydrogenation or hydrocracking of hydrocarbons using a Group VIII metal on a silica support prepared by an ion-exchange technique. The ion-exchange catalysts used in accordance with this invention are prepared by first exchanging hydrogen atoms on a dried silica support with alkaline cations, and then exchanging the alkaline cations with cations of a metal of Group VIII of the Periodic Table.

---

This application is a continuation of S.N. 553,546, filed May 27, 1966 and now abandoned.

According to the present invention a process for the catalytic conversion of hydrocarbons in which the hydrocarbons are passed over a catalyst comprising one or more elemental metals of Group VIa or VIII of the Periodic Table on a refractory inorganic oxide support of an element of Groups II, III or IV of the Periodic Table under conditions such that the metal remains predominantly elemental metal during the treatment, characterised in that the catalyst has been prepared by a technique of ion-exchange followed by the removal of combined water associated with the metal cations and the reduction of at least a proportion of the metal cations to elemental metal by heating the organic oxide containing the metal cations in a reducing atmosphere.

"Ion exchange" means the replacement of hydrogen atoms in the original oxide by metal cations so that the metal is chemically combined with the oxide and not merely admixed with the oxide. This technique, therefore, gives a catalyst with the metal distributed over the support as individual cations or in small aggregations only. It has been found that it is not easy to reduce these cations to elemental metal but that this can be done and that the resulting reduced catalyst then has the metal in a fine state of subdivision with a high ratio of metal surface to total metal. This fine state of sub-division is believed to give significant advantages in use over catalysts prepared by conventional impregnation techniques and allows the use of lower total amounts of metal to obtain a given effect.

The catalysts may be used in any reaction known to be catalysed by the metals specified and particular hydrocarbon conversion reactions which may require elemental metal as the active catalyst component include hydrogenation, particularly at temperatures below 300° C., dealkylation and de-methanation. The preferred metals are the Group VIII metals, particularly the iron group metals, iron, cobalt and especially nickel.

Hydrogenation reactions for which the catalyst may be used include the hydrogenation of unsaturated hydrocarbons, for example olefins, acetylenes and particularly aromatics. Thus the catalyst may be used for the hydrogenation of benzene to cyclohexane, or when partially sulphided, for the selective hydrogenation of diolefins in the presence of mono-olefins, or for the selective hydrogenation of olefins in the presence of aromatics.

The process conditions for the hydrogenation may be chosen from the following ranges:

Temperature ambient to 250° C. preferably 100 to 200° C.
Pressure 0 to 1000 p.s.i.g. preferably 0 to 200 p.s.i.g.
Liquid hourly space velocity 0.1 to 10 v./v./hr., preferably 0.5 to 5 v./v./hr.
Hydrogen:hydrocarbon mole ratio 0.1:1 to 5:1

Dealkylation of alkyl aromatics is another preferred conversion process for the reduced ion-exchanged metal catalysts, particularly the dealkylation of alkyl aromatic hydrocarbons containing from 1 to 4 carbon atoms in side chains, for example toluene, ethylbenzene, and xylenes.

The process conditions for dealkylation may be chosen from the following ranges:

Temperature—250 to 500° C.
Pressure—0 to 1000 p.s.i.g., preferably 100 to 500 p.s.i.g.
Liquid hourly space velocity—0.1 to 10 v./v./hr., preferably 0.5 to 2.0 v./v./hr.
Hydrogen:hydrocarbon mole ratio 0.1:1 to 5:1

When the metal is nickel, the conversion process may be a process for demethanating hydrocarbons (a form of cracking involving successive removal of methyl groups) to give, if the reaction is carried to completion, a product which consists wholly of methane. The process conditions may be chosen from:

Temperature—250 to 500° C.
Pressure—0 to 1000 p.s.i.g.
Liquid hourly space velocity—0.1 to 5.0 v./v./hr. preferably 0.5 to 2 v./v./hr.

The hydrogen:hydrocarbon mole ratio may vary over a wide range depending on the feedstock used and the extent of demethanation. For example the complete conversion of heptane to methane will require a ratio of at least 6:1, while for complete conversion of toluene the minimum ratio is 10:1.

In all the conversion processes, preferred feedstocks are those boiling below 250° C., and particularly hydrocarbons or hydrocarbon fractions derived from petroleum.

As disclosed in copending U.K. application No. 41,-538/65 reduced ion-exchanged nickel catalysts are capable of absorbing sulphur. Depending on the temperature used and the type of sulphur compound, the nickel may be partially sulphided or progressively sulphided until eventually it becomes nickel sulphide. Although nickel sulphide is known to have catalytic activity in itself it is less active than elemental nickel and hence the present invention is limited to the use of catalysts which remain predominantly elemental under the conditions of treatment. This may require the use of low-sulphur feedstocks, containing for example less than 0.001% wt. of sulphur if the conversion conditions include a temperature above 200° C. If the conversion conditions include a temperature of 200° C. or below sulphur compounds can be tolerated in the feedstock provided they are thiophenes, thiacyclo-alkanes containing more than 4 carbon atoms in the ring, or dialkyl monosulphides because these compounds do not give progressive sulphiding. For other sulphur compounds the requirements are the same at temperatures of 200° C. or below as at temperatures above 200° C.

A particularly preferred method of preparing ion-exchanged catalysts suitable for use in the present invention is disclosed in allowed U.S. application Ser. No. 827,097, filed May 14, 1969 which is a continuation application of now abandoned application Ser. No. 553,301, filed May 27, 1966. This method involves contacting a refractory inorganic oxide of an element of Group II, III or IV of the Periodic Table containing hydrogen atoms with an aqueous alkaline solution so that the hydrogen is exchanged for alkaline cations, simultaneously on subsequently contacting the oxide with a solution containing cations of a metal of Groups VIa or VIII of the Periodic Table so that the alkaline cations are exchanged for metal cations, thereafter washing with water to remove substantially all the chemically uncombined alkali and metal cations, drying the composite so formed, removing combined water associated with the metal cations and reducing the cations to elemental metal by heating the inorganic oxide containing the metal cations in a reducing atmosphere.

The refractory inorganic oxide may be a single oxide or a mixture of oxides. The preferred hydrogen-containing oxides are those which do not have strong protons, since it has been found that such oxides cannot be directly ion exchanged with a metal without an intermediate treatment. Preferred oxides are alumina, magnesia and, particularly, silica.

Since oxides can differ appreciably in the number and strength of the protons they carry, experiment may be necessary to determine which oxides are suitable for use. Such experiment however, can be simple and quick. Thus the presence of hydrogen can readily be determined by a preliminary treatment with an alkaline solution followed by a water wash and analysis of the oxide for retained alkali. Similarly the strength of the protons can be tested by treating the oxide with a solution containing metal cations, without a previous alkali treatment, washing and analysing to see if the metal cations have been retained. If they are not retained in substantial amount then a preliminary treatment with alkaline solution is desirable.

The refractory inorganic oxide is prepared prior to treatment according to the present invention. Preparation of an oxide normally involves formation of a hydroxide, drying of the hydroxide to remove excess water and finally calcination of the hydroxide to the oxide. The term "refractory oxide support" includes the dried hydroxide as well as the calcined oxide, but excludes the so called hydrogels or hydrosols containing excess water. The oxide may be formed into particles of a suitable size and shape at any convenient point in the preparation of the catalyst, but preferably before the treatment according to the present invention.

The oxide may be washed with water prior to the treatment with the aqueous alkaline solution to remove any loosely-held impurities and to wet the oxide.

An essential requirement of the method is the washing with water to remove uncombined metal cations. This washing must be carried out while the metal cations are still in a water-soluble state (i.e. before any decomposition or calcination step which would convert uncombined metal cations to a water insoluble state). This washing step distinguishes the process from the conventional impregnation technique in which a decomposition or calcination step follows on the impregnation without an intermediate water wash.

The oxide may, if desired, contact the solutions used by being immersed in them, preferably for a short period of 15 minutes to 24 hours. Alternatively one may percolate the solutions through a bed of oxide particles. This alternative technique provides a further distinction over impregnation techniques in which immersion is usual.

The aqueous alkaline treatment in terms of strength of alkali and contact time should clearly not be such as to destroy the oxide structure itself.

Preferably the treatments with the solutions are carried out successively. Slightly different techniques will be required depending on whether the treatments are simultaneous or successive.

With successive treatments, the alkaline solutions may be derived from the alkali metals of Group I, but the preferred solution is aqueous ammonia. However, solutions of sodium hydroxide may be used and also solutions of salts of weak acids and strong bases for example sodium salts of weak acids, particularly sodium bicarbonate. The total amount of alkali used will depend on the number of protons in the original oxide which can be exchanged for alkaline cations, and this can, if necessary, be determined by a preliminary experiment. Usually an amount of alkali in excess of the amount theoretically required will be used to ensure rapid and efficient exchange of hydrogen by the alkaline cation. Preferably the total amount of alkali used will be up to 20% wt. by weight of oxide. The temperature of the treatment is conveniently ambient temperature, although elevated temperatures may be used if desired.

With successive treatments the oxide may be washed with water after the treatment with the aqueous alkaline solution to remove excess alkali which has not exchanged with the hydrogen of the oxide.

The washing should be continued until the pH of the washing eluent is below the pH at which the metal salt subsequently used forms hydroxides, since if this pH is not reached the metal will be precipitated. The pH varies with the metal used, but, for cobalt and nickel it is 7.7.

The oxide containing alkaline cations is then treated with a solution containing cations of one or more metals from the groups specified. The solutions are preferably solutions of salts of the metal, for example the nitrates, chlorides, and sulphates. The amount of metal cation used will depend on the number of alkaline cations on the oxide, which, as explained above, depends on the original oxide and the same general considerations apply as for the treatment with the alkaline solution. Again the temperature may conveniently be ambient, although elevated temperatures are not excluded.

After the addition of the metal cations the composite so formed is, as stated above, washed with water to remove substantially all the chemically uncombined cations. Anions will also be removed when a salt solution has been used. The composite is then dried to remove water, preferably at 100–120° C.

The water used for washing is desirably free from ions other than those already present on the catalyst and initially, therefore, de-ionised water may be used. Removal of substantially all metal cations not chemically bound to the support will occur when the washing is continued until no further cations are removed from the catalyst. This can readily be determined by analysis of the effluent from the washing. Other conditions for the washing are not critical, affecting only the speed of the catalyst preparation rather than the final result. Suitably the temperature may be in the range 15° C. to the boiling point of water at the pressure used, preferably 15 to 100° C. Atmospheric pressure is preferred, but pressures above or below atmospheric are also suitable. The quantity of water used is suitably 2 ml. to 100 ml. per ml. of catalyst and the length of time of the washing may be from 10 minutes to 10 hours.

With simultaneous treatment, the preferred alkaline solution is again aqueous ammonia, and the preferred metals and the quantities used are also as for the successive treatments. Thus a solution of nickel formate in aqueous ammonia is particularly suitable. With the simultaneous treatment, however, it is desirable to wash with the alkaline solution free of metals before the water wash.

The actual amount of metal on the composite will depend on the original oxide used, but, in general, with the known refractory inorganic oxides the amount is likely to be relatively low and within the range 0.1 to 5% wt. With the preferred oxide, silica, the amount may be 0.01–2% wt. if sodium is the alkali, and 0.01–4% wt. if ammonia is the alkali.

The dried composite having the metal cations distributed over the support as individual cations or in small aggregations is then reduced, but because of the difficulty of reducing the cations by a simple treatment with hydrogen the reduction is carried out by the simultaneous or sequential steps of removing combined water associated with the metal cations and heating the inorganic oxide containing the metal cations in a reducing atmosphere.

It is thus postulated that the difficulty of reducing ion-exchanged cations is the result of association of combined water with the metal cations. This water is not removed by the simple conventional drying of the catalyst at temperatures of 100–120° C. More severe treatment is required to remove this water and particular techniques that have been found to be suitable are (a) heating in a reducing atmosphere at a temperature of at least 350° C. and preferably at least 500° C.,
(b) heating in a stream of an inert gas, such as nitrogen,
(c) displacement of the water by treatment with a hydrocarbon.

In method (a) the removal of water and the reduction occur together, but the method has the disadvantage that high temperatures of at least 350° C., preferably at least 500° C. are required. In method (b) the water is removed in a separate step before the reduction, and this allows the subsequent reduction to occur more readily at lower temperatures. In method (c) the reduction may be simultaneous with or subsequent to the water removal, and in either case, the reduction can be carried out at lower temperatures if desired.

In method (a), the upper limit of temperature will be fixed by the temperature at which the inorganic oxide is likely to be damaged by, for example, loss of surface area or conversion to a less desirable crystalline form, such as, in the case of alumina, alpha-alumina. A convenient practical upper limit for most inorganic oxides is 900° C.

Increased time increases the extent of reduction and the time may conveniently be in the range 3 to 50 hours.

Suitable treatments with an inert gas, method (b), may be at temperatures of from 300 to 600° C. for 3 to 30 hours, less time being required at the higher temperatures.

Suitable displacement techniques, method (c), may be contacted with a hydrocarbon, particularly an unsaturated hydrocarbon, for example isoprene, at temperatures of 250–500° C. for 3 to 8 hours.

For treatments of the (b) and (c) type the reduction may be carried out at temperatures of from 250 to 600° C., preferably 250–400° C., for 3 to 30 hours.

A convenient reducing atmosphere for all the methods is an atmosphere of hydrogen, which may if desired be static, but which is preferably a flowing stream of hydrogen.

The fact that water is associated with the metal cations and that this is responsible for the difficulty of reducing the cations is shown by the evolution of water and by a change in the ultra violet absorption spectrum of the cations during the heating. The change in the spectrum indicated in the case of nickel ions, that the environment of nickel ions passed from hexaquo octahedral divalent nickel to mixed oxyaquo octahedral divalent nickel. Thus water is removed from the nickel co-ordination sphere, which then becomes associated with the oxygen atoms in the silica lattice.

A convenient way of determining the amount of elemental nickel present is by taking a small sample of the catalyst and treating it with an acid such as hydrochloric acid and measuring the amount of hydrogen produced. Ionic metal does not decompose HCl in this way, but instead the metal ions are exchanged back again to hydrogen. Sometimes there may be other qualitative indications as to whether the metal is in ionic or crystalline elemental form, as for example the colour, or the presence of or absence of ferromagnetic properties.

EXAMPLE 1

A catalyst of nickel ion exchanged onto silica was prepared according to the following procedure. A 500 ml. batch of 60–100 mesh (BSS) commercial silica gel was contacted with two 750 ml. aliquots of saturated sodium bicarbonate solution each for 5 minutes. After washing with four 750 ml. aliquots of de-ionised water the solid was contacted with two 750 ml. aliquots of M/2 nickel nitrate solution, each for 5 minutes. After washing with eight 750 ml. aliquots of deionised water the solid was dried overnight at 110° C. The nickel content was 1.2 percent weight.

After reduction in a hydrogen flow of 100 v./v./hr. for 16 hours at 250° C. this catalyst hydrogenated 14 percent of the double bonds present in a 10 percent volume solution of isoprene in n-heptane when operating at 250° C.

A fresh sample of the same catalyst after treatment for 16 hours in a 1000 v./v./hr. nitrogen flow at 400° C., followed by only 3½ hours reduction in hydrogen at 250° C., hydrogenated 77 percent of available double bonds under the same conditions.

EXAMPLE 2

The catalyst used in Example 1, after reduction for 2 hours at 250° C. in 1000 v./v./hr. hydrogen, hydrogenated 7 percent of available double bonds in the isoprene feed at 250° C. After 3½ hours at this temperature it was hydrogenating 35 percent of the double bonds, indicating that the presence of the isoprene was assisting the reduction of the ion-exchanged nickel to elemental nickel.

EXAMPLE 3

A catalyst was prepared by contacting 500 ml. of 6–12 mesh (BSS) commercial silica gel with two 750 ml. aliquots of saturated sodium bicarbonate solution, each for 5 minutes. After washing with three 750 ml. aliquots of deionised water the solid was contacted for 5 minutes with 750 ml. and then with 400 ml. of M/2 nickel nitrate solution. After washing with eight 750 ml. aliquots of deionised water it was dried at 110° C. overnight. The nickel content was 1.02 percent weight.

The dried catalyst was reduced by heating in a stream of hydrogen at 500° C. for 4 hours.

It was then used to demethanate n-heptane under the following conditions

Pressure—450 p.s.i.g.
Space velocity—1 v./v./hr.
$H_2$/hydrocarbon mole ratio 8:1

The temperatures used and the results obtained are given in Table 1 below which also includes, for purposes of comparison, the results obtained with a nickel catalyst prepared by impregnation.

TABLE 1

| Catalyst | Temperatures | | Products |
|---|---|---|---|
| | Reactor block | Catalyst | |
| Ni exchanged Silica gel (1% wt. Ni) | 350 | 395 | 100% conversion to methane. |
| | 300 | 302 | 0% conversion to methane; traces of n-paraffins. |
| | 325 | 365 | 100% conversion to methane. |
| Ni-impregnated on silica gel (1% wt. Ni) | 300 | 270 | 0% conversion to methane. |
| | 325 | 332 | Small amount of conversion to methane. |
| | 350 | 390 | 100% conversion to methane. |

Table 1 shows that the ion-exchanged catalyst is more active than the impregnated catalyst giving 100% conversion at 325° C. against only a small amount of conversion with the impregnated catalyst.

EXAMPLE 4

A catalyst prepared in a similar way to Example 1 using a reduction temperature of 400° C. for 4 hours contained 4.3% wt. nickel-on-silica, 30% wt. of this nickel being in reduced elemental form.

The catalyst was tested for desulphurisation and hydrogenation activity by passing over it a feedstock of 25% volume benzene in an inert diluent, n-heptane, the feedstock containing also 0.05% volume of thiophene.

Its activity was compared with a catalyst of 10% wt. nickel-on-sepiolite prepared by impregnating the sepiolite with a solution of nickel formate in ammonia, drying the nickel formate-sepiolite composite at 110° C. for 16 hours, and reducing the nickel formate to nickel at 250° C. for 4 hours.

Both catalysts were in the form of 6–12 mesh BSS particles and the feedstock was passed over the catalysts at 200 p.s.i.g. and 2.0 liquid hourly space velocity. The temperature was 120° C., but there were slight variations during the course of the run on either side of this figure.

The hours on stream, the amount of sulphur passed, the temperature, and the activity for hydrogenating the benzene to cyclohexane are given in Table 1 below for the two catalysts.

TABLE 2

| Catalyst | Hours on stream | Sulphur passed over catalyst as S/Ni atom ratio | Temperature, ° C. | Activity (percent cyclohexane formed) |
|---|---|---|---|---|
| Ni exchanged silica | [1] 1 | 1.7×10⁻² | 115 | 100 |
|  | 1½ | 3.91×10⁻² | 129 | 100 |
|  | 2 | 6.45×10⁻² | 131 | 87.5 |
|  | 2½ | 7.6×10⁻² | 125 | 66.8 |
|  | 3 | 9.14×10⁻² | 123 | 39.6 |
|  | 3½ | 1.07×10⁻¹ | 112 | 30.9 |
|  | 4 | 1.23×10⁻¹ | 106 | 20.9 |
|  | 4½ | 1.38×10⁻¹ | 106 | 6.2 |
|  | [2] 5 | 1.58×10⁻¹ | 121 | 11.8 |
|  | 5½ | 1.78×10⁻¹ | 113 | 1.6 |
|  | 6 | 1.87×10⁻¹ | 111 | 0.8 |
|  | 6½ | 2.02×10⁻¹ | 107 | 1.4 |
| Ni-sepiolite | [3] 1 | 1.11×10⁻² | 137 | 100 |
|  | 2 | 2.14×10⁻² | 129 | 100 |
|  | 3 | 3.04×10⁻² | 114 | 96.3 |
|  | 4 | 3.94×10⁻² | 111 | 83.1 |
|  | 5 | 4.84×10⁻² | 121 | 48.4 |
|  | 6 | 5.75×10⁻² | 135 | 55.0 |
|  | 7 | 6.63×10⁻² | 113 | 45.1 |
|  | 8 | 7.55×10⁻² | 112 | 6.1 |
|  | 9 | 8.44×10⁻² | 111 | 0 |
|  | 10 | 9.33×10⁻² | 111 | 0 |

[1] Catalyst had previously hydrogenated benzene (free of sulphur) at 100 percent activity for 23¼ hours.
[2] Slight reactivation after overnight shutdown in hydrogen.
[3] Catalyst had previously hydrogenated benzene (free of sulphur) at 100 percent activity for 3½ hours.

The results of Table 1 are shown in graphical form on the accompanying figure in which the hydrogenation activity is plotted against sulphur atoms passed/atom of nickel.

The results show that a catalyst prepared according to the present invention has a better hydrogenation activity in the presence of thiophene sulphur than nickel-sepiolite, which, it should be emphasized, is itself a good and well-established hydrogenation catalyst, with a degree of dispersion of the elemental nickel which is high for impregnated catalysts.

EXAMPLE 5

The reduced nickel catalyst prepared as in Example 3 was used to dealkylate toluene to benzene at atmospheric pressure, 0.5 v./v./hr. i.e. a hydrogen:hydrocarbon mole ratio of 1:1.

The temperatures used and the results obtained are given in Table 3 below.

TABLE 3

| Temperature, °C. | | Product analysis, percent wt. | | | | Product yield, percent wt. on feed |
|---|---|---|---|---|---|---|
| Block | Catalyst | Aliphatics | Benzene | Toluene | Xylenes | |
| 325 | 329 | 0.4 | 39.8 | 56.7 | 3.1 | 87.7 |
| 350 | 359 |  | 46.4 | 49.1 | 4.5 | 79.9 |
| 375 | 383 |  | 45.0 | 49.6 | 5.4 | 86.8 |
| 401 | 410 |  | 47.0 | 48.4 | 4.6 | 80.7 |

A comparative run using a 10% wt. nickel on sepiolite catalyst prepared by impregnation gave the following results:

TABLE 4

| Temperature, °C. | | Product analysis, percent wt. | | | | Product yield, percent wt. on feed |
|---|---|---|---|---|---|---|
| Block | Catalyst | Aliphatics | Benzene | Toluene | Xylenes | |
| 280 | 285 | 3.0 | 29.5 | 63.7 | 3.8 | 85.7 |
| 299 | 304 |  | 36.7 | 58.8 | 4.5 | 79.9 |
| 325 | 330 |  | 39.7 | 55.5 | 4.8 | 82.2 |
| 350 | 355 |  | 37.9 | 57.1 | 5.0 | 81.2 |

It will be seen that the 1 percent weight nickel exchanged silica catalyst has a comparable, or slightly better, activity than the 10 percent weight impregnated nickel sepiolite catalyst at a given temperature.

EXAMPLE 6

The reduced catalyst of Example 3 was used to convert toluene to methane at 450 p.s.i.g., 0.5 v./v./hr. and a hydrogen:hydrocarbon mole ratio of 2:1 (a 2 mol excess for the reaction $C_7H_6+10H_2=7CH_4$).

The temperatures used and the results obtained are given in Table 5 below.

TABLE 5

| Temperature, °C. | | Liquid product yield, percent wt. | Product analysis |
|---|---|---|---|
| Block | Catalyst | | |
| 301 | 323 | 103.1 | 9.0% wt. cyclohexane, 88.5% wt. methylcyclohexane, 0.3% wt. toluene, remainder paraffins. |
| 326 | 347 | 99.3 | 24.8% wt. cyclohexane, 67.3% wt. methylcyclohexane, 0.5% wt. toluene, remainder paraffins. |
| 350 | 399 | Nil | No liquid product. Gaseous product contained methane and the excess hydrogen, with only traces of $C_2$–$C_3$ hydrocarbons (<0.5% vol.). |

EXAMPLE 7

The reduced catalyst of Example 3 was used to convert a light petroleum distillate of 160° C. end point to methane at 450 p.s.i.g., 1.0 v./v./hr. and a hydrogen:hydrocarbon mole ratio of 8:1. The block temperature was increased by 10° C. steps during the run. At a block temperature of 350° C. the catalyst temperature increased to 400° C.; no liquid products were obtained, and the gaseous product consisted of methane and the excess hydrogen, with only traces of $C_2$–$C_3$ hydrocarbons (<0.5 percent vol.).

What is claimed is:
1. A process for the hydrogenation of hydrocarbons in which the hydrocarbons are passed in the presence of hydrogen at a temperature of from ambient to 250° C., a pressure of from 0 to 200 p.s.i.g. and a space velocity of 0.1 to 10 v./v./hr. over a catalyst comprising nickel on a dried silica support under conditions such that the nickel remains predominantly elemental nickel during the treatment, characterized in that the catalyst has been prepared in ion-exchanging nickel cations on the silica by contacting silica with an aqueous alkaline solution so that hydrogen is exchanged for alkaline cations selected from the group consisting of alkali metal and ammonium, simultaneously or subsequently contacting the silica with a solution containing nickel cation so that the alkaline cations are exchanged from metal cations thereafter washing with water to remove substantially all the chemically uncombined alkali and nickel cations, drying the composite so formed, removing combined water associated with the nickel cations and reducing the nickel cation to elemental nickel by heating the silica containing the nickel cations in a reducing atmosphere.

2. A process as claimed in claim 1 which is a process for the hydrogenation of unsaturated hydrocarbons at temperatures of from ambient to 250° C.

3. A process as claimed in claim 1 wherein the temperature is from 100 to 200° C., and the hydrogen:hydrocarbon mole ratio from 0.1:1 to 5:1.

4. A process as claimed in claim 1 which is a process for the dealkylation of alkyl aromatics at temperatures of 250 to 500° C.

5. A process as claimed in claim 4 wherein the hydrogen:hydrocarbon mole ratio from 1:1 to 5:1.

6. A process as claimed in claim 1 which is a process for demethanating hydrocarbons at temperatures of 200 to 600° C.

7. A process as claimed in claim 6 wherein the liquid hourly space velocity from 0.1 to 5 v./v./hr.

8. A process as claimed in claim 1 wherein the feedstock contains less than 0.001% wt. of sulphur at conversion temperatures above 200° C.

9. A process as claimed in claim 1 wherein the feedstock contains less than 0.001% wt. of sulphur at conversion temperatures of 200° C. or below in the form of sulphur compounds other than thiophenes, thiacycloalkanes containing more than 4 carbon atoms in the ring, and dialkylmonosulphides.

10. A process as claimed in claim 1 wherein the metal content of the catalyst is in the range of 0.1 to 5% wt.

11. A process for the hydrocracking of hydrocarbons at a temperature of from 200° to 600° C. a pressure of from 0 to 1000 p.s.i.g. and a space velocity of 0.1 to 10 v./v./hr. over a catalyst comprising nickel on a dried silica support under conditions such that the nickel remains predominantly elemental nickel during the treatment, characterized in that the catalyst has been prepared by ion-exchanging nickel cations on to silica by contacting silica with an aqueous alkaline solution so that hydrogen is exchanged for alkaline cations selected from the group consisting of alkali metal and ammonium, simultaneously or subsequently contacting the silica with a solution containing nickel cation so that the alkaline cations are exchanged for metal cations thereafter washing with water to remove substantially all the chemically uncombined alkali and nickel cations, drying the composite so formed, removing combined water associated with the nickel cations and reducing the nickel cation to elemental nickel by heating the silica containing the nickel cations in a reducing atmosphere.

12. A process as claimed in claim 11 wherein the metal content of the catalyst is in the range 0.1 to 5% wt.

References Cited

UNITED STATES PATENTS

| | | | |
|---|---|---|---|
| 2,955,090 | 10/1960 | Richards | 252—455 |
| 3,293,170 | 12/1966 | Goble et al. | 208—111 |
| 1,925,820 | 9/1933 | Ryerson | 252—439 |
| 2,422,671 | 6/1947 | Haensel et al. | 252—459 |
| 3,047,491 | 7/1962 | Carr | 208—136 |

HERBERT LEVINE, Primary Examiner

U.S. Cl. X.R.

208—143; 260—672

PO-1050
(5/69)

UNITED STATES PATENT OFFICE
CERTIFICATE OF CORRECTION

Patent No. 3,597,348  Dated  AUGUST 3, 1971

Inventor(s) KENNETH HUGH BOURNE, CHRISTOPHER JOHN LEONARD METCALF and ALAN RICHARD THORNHILL It is certified that error appears in the above-identified patent and that said Letters Patent are hereby corrected as shown below:

Column 2, line 33, "500" should read -- 600 --;

Column 2, line 58, after "elemental", insert -- metal --;

Column 5, line 48, "500" should read -- 400 --;

Column 6, line 15, "100 v./v./hr." should read -- 1000 v./v./hr. --

Claim 1, line 9, "in" should be -- by --; and

Claim 1, line 15, "from" should be -- for --.

Signed and sealed this 25th day of January 1972.

(SEAL)
Attest:

EDWARD M. FLETCHER, JR.
Attesting Officer

ROBERT GOTTSCHALK
Commissioner of Patents